Oct. 1, 1957 H. F. OLSON ET AL 2,808,466

METHODS OF RESTORING PHONOGRAPH RECORDS

Filed Nov. 1, 1955 2 Sheets-Sheet 1

INVENTORS
HARRY F. OLSON &
HERBERT BELAR
BY Morris A. Lakin
ATTORNEY

Oct. 1, 1957 H. F. OLSON ET AL 2,808,466

METHODS OF RESTORING PHONOGRAPH RECORDS

Filed Nov. 1, 1955 2 Sheets-Sheet 2

INVENTORS
HARRY F. OLSON &
HERBERT BELAR

BY Morris A. Rabkin

ATTORNEY

United States Patent Office 2,808,466
Patented Oct. 1, 1957

2,808,466

METHODS OF RESTORING PHONOGRAPH RECORDS

Harry F. Olson, Princeton, and Herbert Belar, Palmyra, N. J., assignors to Radio Corporation of America, a corporation of Delaware Application November 1, 1955, Serial No. 544,242

5 Claims. (Cl. 179—100.1)

Figure 1:
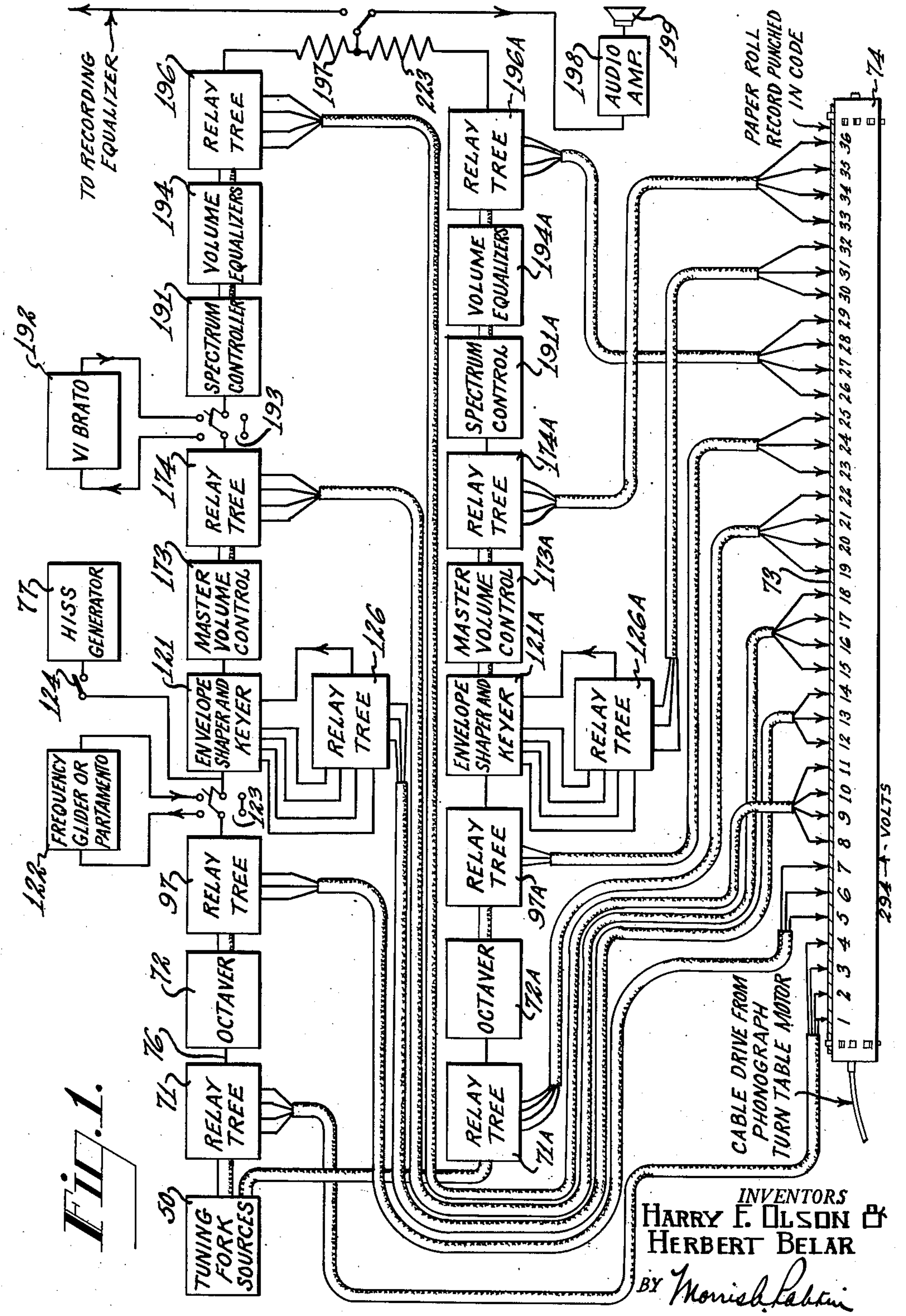

The present invention relates to methods of restoring phonograph recordings; and more particularly to novel methods for reclaiming recordings by analyzing all or a portion of the frequency spectrum of a recording to be restored, and reconstituting all or a part of the recorded spectrum with additions and/or omissions in predetermined or selected frequency ranges.

An object of the present invention is to provide novel methods for reclaiming phonograph recordings while preserving the significant original portion of the recording.

Another object of the present invention is to provide novel methods for reclaiming phonograph recordings by analyzing portions of the frequency spectrum of the recording and resynthesizing the analyzed portions for combination with original and unchanged portions of the recording.

A further object of the present invention is to provide novel methods for reclaiming phonograph recordings in such a manner as to eliminate unwanted noise inherently present when the recordings are reproduced without modifying original and musically significant portions of the recordings.

A still further, and closely related, object of the present invention is to provide novel methods of synthesizing portions of old recordings while at the same time preserving virtuosity of the original recording.

A still further object of the present invention is to provide a recording in or on any recording medium, from which an unlimited number of copies may be made, of a restored, and, if desired, enhanced phonograph record.

A still further object of the present invention is to provide, as an article of manufacture, a restored, and, if desired, enhanced phonograph record.

It is contemplated that methods of the present invention will be practiced in restoring rare phorograph recordings in a manner which is impossible without the aid of the present invention. Some old phonograph recordings may have great commercial value were it not for technical defects in the early recordings. It is proposed to analyze the portion of the frequency band of the record which is defective (or any other frequency band or bands) and synthesize it (or them) and then combine it with the portion of the original which is still satisfactory. Thus the original feature of the old record would not be just a repaired copy but truly, in that portion at least, part of the original recording. Moreover, this means less work and can result in a closer approximation with less effort.

In vocal and instrumental recordings which were recorded by acoustic methods used in the early days of the phonograph art, the vocal portion of the recording or the solo instrumental portion of the recording may, for example, lack high frequency components. High frequency components, suiting the original, may be synthesized for combination with the original performance upon re-recording. The synthesized portion will, in effect, restore the original performance to its original frequency range as heard directly in the recording studio during the recording session. The effect is a true restoration which is impossible to achieve by "dubbing" methods, since such last-named methods involve characteristic performances of other musicians which must be excluded if the original is to be completely restored.

Figure 2:
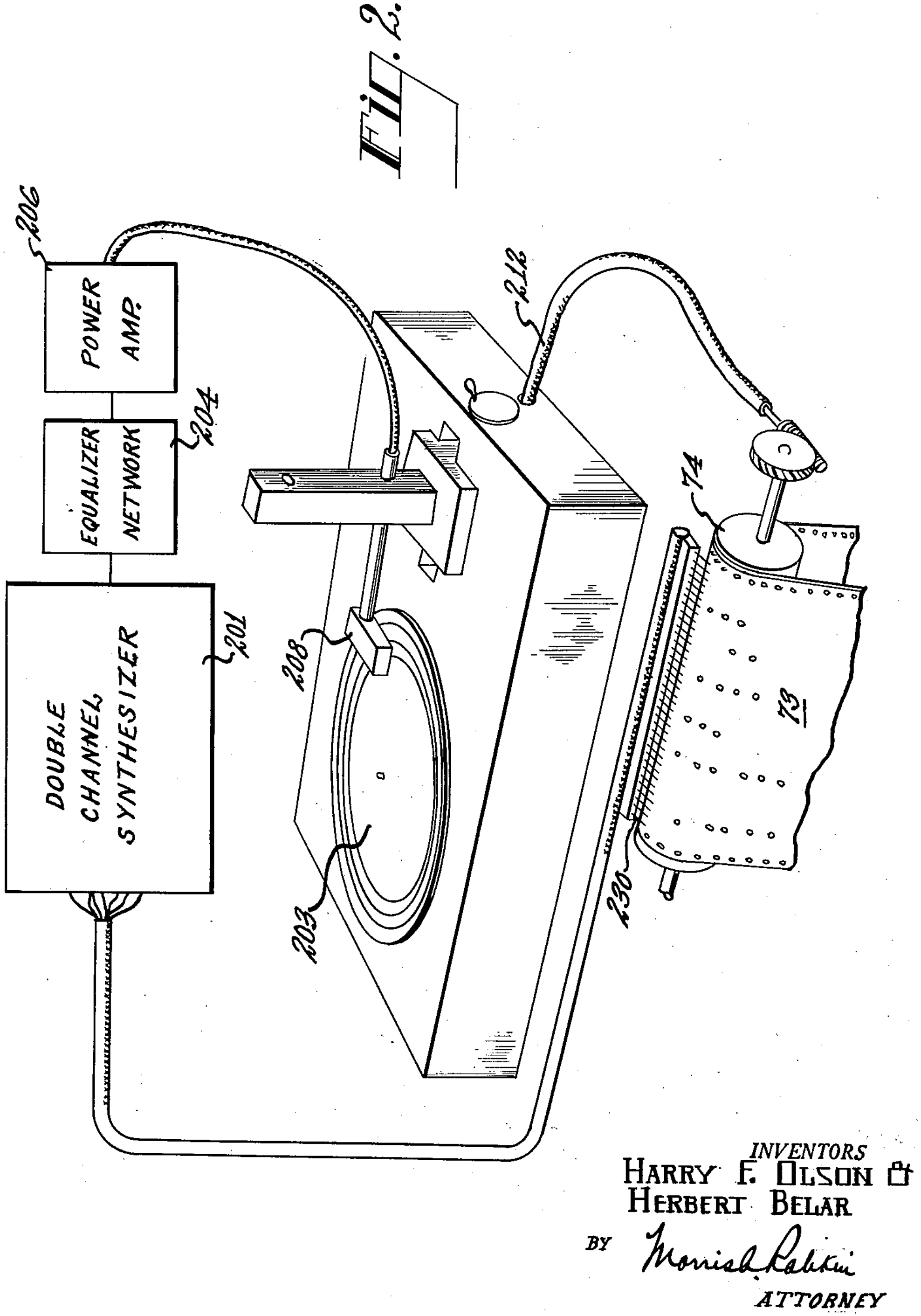

Other objects, features, and advantages of the invention will be apparent from the following description taken in connection with the accompanying drawing in which:

Figure 1 is a block diagram illustrating the music synthesizer to be employed in carrying out restoration operations in accordance with the present invention; and Fig. 2 is a view in perspective showing the overall system employed in synthesizing and recording portions of the frequency spectrum of a phonograph recording in process of restoration.

The invention will be explained with particular reference to the restoration of a recording of a solo performance on the violin by any eminent artist who is no longer performing. An available copy of such a record will have surface noise or "scratch." It may also have damaged portions which in ordinary reproduction will cause noise irrelevant to the music of the original performance. If the soloist has originally recorded the selection with orchestral accompaniment the spectrum will be limited, that is to say low pitched sounds and high pitched sounds of the orchestral accompaniment will be lacking. Simply to override the original orchestral accompaniment with a new dubbed-in orchestral performance would defeat, wholly, or in part, the purpose of restoration since the original orchestral accompaniment necessarily bore some particular relationship with the performance of the soloist, vocal or instrumental. In greater measure, restoration would be defeated if an irrelevant performance by another vocalist or by another performer on the solo instrument were dubbed-in even though electronic means were included in a recording channel to partially or substantially eliminate the frequency spectrum covered by the original record leaving only the highs and lows to be added by the dubbing procedure.

As pointed out above, restoration is accomplished by synthesizing any portion which is to be added or reconstituted. The basis for reconstitution is an analysis of the original performance. An application for Letters Patent of the United States by Olson and Belar, Ser. No. 263,252, filed December 26, 1951, for "Music Synthesizer" describes a synthesizer and its use, and for the sake of completeness of disclosure a curtailed description of the synthesizing apparatus described in the said application will be given herein.

Any musical tone whatsoever may be synthesized if the synthesizer is provided with the following facilities: Means for producing a tone with any fundamental frequency within the audio frequency range. Means for producing a tone with any overtone structure. Means for producing a tone of any growth, duration or decay characteristic. Means for changing the overtone structure at any time. Means for changing the intensity of the tone at any time. Means for introducing a vibrato. Means for providing a portamento or glide from a tone of one frequency to a tone of a different frequency. Means for providing a deviation from the regular.

Each individual note is synthesized under the control of a punched paper roll or other suitable coded record. The synthesizer output under the control of said paper roll record may be the music of a violin or a trumpet, for example. In this case, whether the output is being heard directly or is being recorded, a single synthesizer channel might be employed but preferably two synthesizer channels are employed so that they may produce notes alternately or overlapping as explained hereinafter. If the direct (unrecorded) output of the synthesizer is to be the music of a piano or orchestra, for example, the number of synthesizer channels must be greatly increased.

In Fig. 1 the signal frequency sources, such as tuning forks, are indicated by the block 50. Also, the block 50 includes, or may include, a random noise or hiss source that is useful in synthesizing sounds such as those from a snare drum, for example. In addition, the block 50 includes, or may include, a mixer that may be utilized for mixing the outputs of all the signal frequency sources or any desired number of them for obtaining special effects. All or part of the signal frequency sources may be connected into the mixer for obtaining certain effects. The outputs of the included twelve fork sources may correspond to the twelve notes in the equally tempered scale. Tone wheels, oscillators, or any other suitable signal source may be substituted for the tuning forks. A suitable random noise or hiss circuit may comprise a gas tube and an amplifier of amplifying the noise generated in the gas tube.

Referring again to Fig. 1, a binary relay switching arrangement or relay tree 71 is employed for connecting any desired tuning fork source to the input of an octaver 72. A relay tree of this type is described in Electrical Engineering, page 958, volume 68, 1949. By employing a binary switching arrangement in combination with a coded record such as a punched paper roll 73, it has been possible to reduce very greatly the number of contacts required at the coded record. The paper roll 73 passes between brushes or contacts points numbered 1 to 36, inclusive, and a metal contact and driving roller 74 having sprockets at each end. The general reference character 230 is used in Fig. 2 to designate the brushes or contact points. When a hole in the paper roll falls under a brush, a relay coil of the relay tree 71, connected to said brush, is energized to pull down the associated relay armatures.

By employing a binary code it is a comparatively simple matter to code a paper roll in accordance with a particular piece of music. By means of a four-hole code it is possible to connect any desired one of the tuning fork sources to the octaver 72. Also, the hiss source may be connected to the octaver 72 by having a proper code punched in the paper roll. In the present example said proper code consists of holes punched to let brushes 2, 3 and 4 make contact with the roller 74 since they correspond to the binary numbers 2, 4 and 8 which add up to 14.

It is desirable at times to utilize a hiss generator without having the hiss go through the octaver. A hiss generator connected for such use is shown at 77 in Fig. 1.

The octaver 72 is a unit for producing a selected note in any desired octave within the range of the synthesizer. The output of each octaver is a sawtooth wave. A sawtooth wave is very satisfactory because it is rich in all the harmonics of the fundamental frequency. Outputs of other waveshapes might be employed. For example, in synthesizing the tones of some instruments it may be desired to use a waveshape having only odd harmonics, such as a square wave, or a waveshape having only even harmonics.

There are, or may be, eight sawtooth outputs from the octaver 72 so that any note selected by the relay tree 71 may be played in any one of eight octaves.

The octave selection is accomplished by means of a second relay tree 97 which is somewhat similar to the relay tree 71. Relay tree 97 is controlled from the brushes 5, 6 and 7 in association with a three-hole code in the paper roll. The saw-tooth outputs of the octaver are supplied to the input terminals of the relay tree 97.

An envelope shaper and keyer unit, shown at 121, controls the rise, the duration, and the decay of the note or signal passed through the synthesizer channel. It performs a double function; it shapes the signal envelope, and it opens and closes the synthesizer channel.

The output of the octaver relay tree 97 may be supplied directly to the envelope shaper and keyer unit 121, or it may be supplied to said unit through a frequency glider or portamento unit 122 by means of a double-pole double-throw switch 123 when the switch is in the "up" position. A portamento unit is described in Patent No. 2,720,133, granted to Adolph R. Morgan on October 11, 1955. When the switch 123 is in the "down" position there is a direct connection from the octaver relay tree 97 into the envelope shaper and keyer unit 121. The switch 123 may be opened and a switch 124 closed so as to supply the output of the hiss generator 77 to the envelope shaper and keyer 122 instead of the output of the octaver.

The envelope shaper and keyer unit 121 is controlled by a relay tree 126 which is the same as the relay tree 97. In the particular example shown, the relay tree 126 is controlled from the brushes 12, 13 and 14 in association with a three-hole code in the paper roll.

The shaper and keyer unit 121 comprises an amplifier and associated biasing or unblocking circuits under control of the coded paper roll. The amplifier is normally blocked by holding it biased beyond cut-off so that no signal passes through the synthesizer channel until an unblocking signal is applied to the amplifier. The shape of this unblocking signal is determined by a bias network selected by the relay tree 126. Furthermore, the shape of the signal envelope is determined by the shape of the unblocking signal.

It may be mentioned at this point that in the preferred operation of the synthesizer the paper roll is coded so that all units of the synthesizer channel are set up before the amplifier is unblocked. In this way the appearance of relay clicks, et cetera, in the final output is avoided.

The synthesizer channel is blocked, due to the amplifier in the shaper and keyer unit 121 being blocked, until code holes appear under one or more of the brushes 12, 13 and 14. When a punched code appears under these brushes this amplifier unblocks and its gain rises. When the punched code leaves the brushes 12, 13 and 14, this amplifier is biased beyond cut-off and blocked.

The output of the envelope shaper and keyer 121, specifically the output of the amplifier therein, is fed to a master volume control unit 173 which is controlled by a relay tree 174. The relay tree 174 is the same as relay tree 71 and is controlled by contact points or brushes 15, 16, 17 and 18 associated with the coded paper roll. The output of the master volume control relay tree 174 is passed through a signal spectrum controller unit 191 which is largely for the purpose of determining the harmonic content of the tone. This is the unit that determines to a great extent whether a tone sounds like that of a violin or like that of a trumpet, for example.

A vibrato unit 192 may be connected in cascade with the spectrum controller 191 by means of a double-pole double-throw switch 193. Normally this would be connected in if violin music, for example, were being played. The spectrum controller unit 191 comprises filters and networks of various types that may be selectively connected into the synthesizer channel by suitable means such as switches or cord connections. The unit 191 comprises, for example, high and low pass filters, resonator filters and compensator networks. Cord connections or other means may be used in the spectrum controller 191 to connect desired combinations of the filters and compensator networks. The output of the master volume control 173 is fed to a volume equalizer unit 194 through the combination or combinations of filters and compensator networks. The output of the master volume control unit is fed to one input terminal number of the volume equalizer unit 194. Said output is also connected through cord connections and an equalizer unit to another input terminal number of the equalizer unit 194.

The volume equalizer unit 194 preferably comprises an individual vacuum tube amplifier for each equalizer input connection or terminal. Each amplifier output circuit connects to an input terminal of a relay tree 196 which is the same as relay tree 71. The output volume of each amplifier of unit 194 is individually adjustable. In this way any change in volume caused by the insertion of a different filter or network in the spectrum controller may be compensated. The above process of equalizing volume is not essential but it is very useful in practice because it simplifies the coding for the master volume control unit. With the volume equalized as described, the volume of the synthesizer channel output (the output of relay tree 196) is a definite function of the punched code actuating the master volume control unit.

The relay tree 196 is controlled by contact points or brushes 8, 9, 10 and 11 associated with the coded paper roll. By punching the proper code to be passed under brushes 8, 9, 10 and 11, any spectrum controller network combination that has been set up may be selected and connected in cascade with the rest of the synthesizer channel.

The output of relay tree 196 may be connected through an isolating resistor 197 to a recording equalizer network in the event a record is to be cut, or to an audio frequency amplifier 198 and loudspeaker 199 in the event the music is to be heard directly from the synthesizer. The spectrum of a tone may be changed while sounding the tone. This is important for synthesizing some sounds. If the tone spectrum is to be changed while the tone is being sounded, it may be preferred to make the relay tree 196 of the vacuum tube relay type. The mechanical relay type may be used, but the change from one spectrum to another will be abrupt and may introduce a click or ping. The vacuum tube type relay, if substituted for relay tree 196, can be adjusted to give a more gradual change from one spectrum to another.

It is desirable to employ two synthesizer channels so that the coded paper record can set up one channel while the other channel is in operation and producing a tone; also, so that one channel can start playing a tone before the other channel stops playing a tone.

A second channel which is a duplicate of the one previously described is shown. Everything is duplicated except the frequency sources of block 50. The second synthesizer channel comprises the frequency sources 50 common to the two channels, the relay tree 71A, an octaver 72A, a relay tree 97A, an envelope shaper and keyer 121A, a master volume control unit 173A, a relay tree 174A, a spectrum controller 191A, a volume equalizer unit 194A and a relay tree 196A. The output of the second channel is fed through an isolating resistor 223 to the output terminal. Thus, the outputs of the two channels may be supplied successively or simultaneously to a record cutter or to a loudspeaker. Instead of using the isolating resistors 197 and 223, it may be preferred to employ a combining amplifier (two tubes with a common output) to which the two channel outputs are applied.

The relay trees of the second channel are controlled by contact points or brushes 19 to 36, inclusive, which are associated with the coded paper roll. The second channel is controlled by the brushes 19 to 36 in the same way that the first channel is controlled by the brushes 1 to 18.

Inspection of Fig. 1 shows that one half of the paper roll (the left side as viewed in Fig. 1) carries the punched coding for the first channel, while the other half of the roll carries the coding for the second channel.

In order to simplify the drawing, the portamento and vibrato units are not shown associated with the second channel. However, it should be understood that ordinarily if such units are connected into the first channel, corresponding units are also connected into the second channel. Likewise, if the hiss generator is connected into the first channel, a similar hiss generator is similarly connected into the second channel. It is apparent that two channels are required to play one note before another note has ended. However, the use of two channels is important for another reason.

Fig. 2 shows a recording system connected to the synthesizer indicated at 201 for cutting a record 203. The output of the two synthesizer channels is passed through an equalizer network 204 to compensate for the record characteristic in accordance with common practice. The signal is then amplified by a power amplifier 206 and fed to the record cutter 208. This particular recording system cuts a conventional 33⅓ R. P. M. lateral modulation disc.

The disc recorder is coupled to the record paper drive roller 74 by means of a flexible shaft 212. In this way the paper record 73 is synchronized with the disc record 203.

A sixteen inch disc record can accommodate six three-minute recordings. Thus, by way of example, after six complete recordings have been made, which represent six different parts of a musical rendition, the six recordings can be combined in a single recording.

The synthesizer described above is able to produce any kind of audio signal. So, if we start with a proper analysis, and make the correct set-up, almost any sound that may have ever been recorded can be duplicated. Therefore given an old recording, which has technical defects but which is otherwise of value, it can be analyzed as to frequencies, harmonic spectra, and amplitude during small elements of time and also of the rate of changes of these parameters with time. This information can then be used by a synthesist who, with a synthesizer described above, can duplicate the original. It has been proved by listening tests that this duplication can be made with sufficient accuracy so that most listeners cannot distinguish between it and the original performance. With the analysis on hand, one skilled in the acoustic arts can recognize "scratch," for instance, and this can be eliminated from the duplicate by the simple process of not synthesizing it. By way of illustration of the process disclosed herein, an old recording of Fritz Kreisler playing the "Old Refrain" was synthesized with and without the original scratch noise.

When an old record, such as the one just mentioned, is analyzed, it will be found that most of the scratch or surface noise is above, say, the 1,000 cycle range. The synthesist, in practicing the present invention, can save considerable work by leaving the portion below 1,000 cycles as it is and analyzing everything above 1,000 cycles. What is recognized as scratch can be subtracted prior to synthesis. Also, if necessary, what is known from analyses to be required to restore the proper overtone structure can be added. The synthesized high frequency and the original low frequency end can then be combined. Thus, all of the timing, glides in frequency, and many other nuances due to the artists original interpretation would not just be duplicated but would still be his very own. In the example given, scratch was mentioned as the technical defect of the old recording and this is a common defect. The proces disclosed herein, however, can be applied to any other defect or range. It need not be a frequency range since it can be a volume range, for example. Some old vocal records may be satisfactory during loud passages but be too noisy in the softer ones. Here, only the softer passages, or parts of them, need be synthesized.

Analysis of the harmonic spectra and amplitudes can be obtained. Also, the analysis will include information as to the rate of change of volume. During the synthesizing step any source of information can be used by the synthesist for adding to the original recording. For example, and considering again the Kreisler recording, the exact instrument used by Kreisler in the original recorded performance may be available. If the identical instrument is not available, a closely similar instrument may be available. The synthesist then can, for a very short interval of time, determine the characteristic of a produced tone of the available instrument. This can be done a sufficient number of times so that the frequency range of the old recording at successive instants of time can be extended by addition without in any way altering what has been recorded of the original performance.

The synthesist, having prepared the necessary number of punched sheets 73 can use these sheets to produce any number of records similar to the record 203 in Fig. 2 of the drawing. Transduced signals from these records can then be combined in a single recording to provide the restoration of the original, and sometimes rare, recording which is to be restored. This single recording may be on tape or on a single disc record. The latter may be a master which can be copied by known procedures to provide any number of commercially saleable copies, pressings, for example. If the single recording is on tape, it can be duplicated to provide commercially saleable copies on tape.

A punched sheet may be made of the synthesized portion of the spectrum of the original record above 1,000 cycles, but with noise and scratch eliminated. Another punched sheet may be made to synthesize the results of an analysis of the higher frequencies of the original solo instrument, if it is available. Rare and very valuable solo instruments are usually preserved and are available. In the case of a violin it can be bowed in such a way to permit analysis of its higher harmonics and overtones for fundamentals of notes played in the original performance. Glide or portamento passages may be approximated by synthesis with the vibrato unit 192 in operation. As the time duration is short, the approximation will be valid to the listener's ear. Further punched sheets may be prepared by synthesizing by application of the synthesist's skill, upper and lower registers to match the preserved portion of the spectrum of the original recording. The added upper anl lower registers will thus be like or suit the original performance at the original recording session.

What is claimed is:

1. The method of reclaiming the selection recorded on a phonograph record whereby to eliminate defects, including surface noise, in reproduction of said selection comprising the steps of analyzing the frequency spectrum of said selection including surface noise frequencies and frequencies higher than the frequency of said surface noise and including frequencies representing other noise, preparing a binary coded record in accordance with said analysis of said frequencies higher than the frequencies of said surface noise with said other noise frequencies omitted, and producing a recording of said last-named frequencies by synthesis under control of said coded record.

2. The method of reclaiming the selection recorded on a phonograph record whereby to eliminate defects, including surface noise, in reproduction of said selection comprising the steps of analyzing the frequency spectrum of said selection including surface noise frequencies and frequencies higher than the frequency of said surface noise and including frequencies representing other noise, preparing a binary coded record in accordance with said analysis of said frequencies higher than the frequencies of said surface noise with said other noise frequencies omitted, producing a first recording of said last-named frequencies by synthesis under control of said coded record, preparing another binary coded record in accordance with said analysis of frequencies lower than frequencies in said selection, said last-named frequencies being of a character to suit the frequency spectrum of the lower frequencies present during original performance of the selection for recording said selection, producing another recording of said lower frequencies by synthesis under control of said second-named coded record, and combining said first-named recording and said second-named recording to provide a restored record.

3. The method of reclaiming the selection recorded on a phonograph record whereby to eliminate defects, including surface noise, in reproduction of said selection comprising the steps of analyzing the frequency spectrum of said selection including surface noise frequencies and frequencies higher than the frequency of said surface noise and including frequencies representing other noise, preparing a binary coded record in accordance with said analysis of said frequencies higher than the frequencies of said surface noise with said other noise frequencies omitted, producing a first recording of said last-named frequencies by synthesis under control of said coded record, preparing another binary coded record of frequencies higher than the frequencies in said selection recorded on said record, said last-named frequencies being of a character to suit the frequency spectrum of the higher frequencies present during original performance of the selection for recording said selection, producing a further recording of said higher frequencies by synthesis under control of said second-named coded record, and combining said first-named recording and said second-named recording to provide a restored record.

4. The method of reclaiming the selection recorded on a phonograph record whereby to eliminate defects, including surface noise, in reproduction of said selection comprising the steps of analyzing the frequency spectrum of said selection including surface noise frequencies and frequencies higher than the frequency of said surface noise and including frequencies representing other noise, preparing a binary coded record in accordance with said analysis of said frequencies higher than the frequencies of said surface noise with said other noise frequencies omitted, producing a first recording of said last-named frequencies by synthesis under control of said coded record, preparing another binary coded record of frequencies lower than frequencies in said selection, said last-named frequencies being of a character to suit the frequency spectrum of the lower frequencies present during original performance of the selection for recording said selection, producing another recording of said lower frequencies by synthesis under control of said second-named coded record, preparing a further binary coded record of frequencies higher than the frequencies in said selection recorded on said record, said last-named frequencies also being of a character to suit the frequency spectrum of the higher frequencies present during original performance of the selection for recording said selection, producing a further recording of said higher frequencies by synthesis under control of said third-named coded record, and combining said first-named recording, said second-named recording and said last-named recording to provide a restored record.

5. The method of reclaiming the selection recorded on a phonograph record whereby to extend the frequency range thereof to correspond to the performance originally recorded comprising the steps of analyzing a plurality of frequency spectra of said selection, preparing a binary coded record in accordance with said analysis of one of said spectra, producing a first recording of said one spectrum by synthesis under control of said coded record, preparing a second binary coded record in accordance with said analysis of another of said spectra, producing a second recording under control of said second-named coded record, preparing a third binary coded record of frequencies outside of the range of frequencies of said selection recorded on said record, said last-named frequencies being of a character to suit the frequencies present during said original performance of the selection for recording said selection, producing a further recording by synthesis under control of said third-named coded record, and combining said first-named recording, said second-named recording and said last-named recording to provide a restored record.

No references cited.